(12) United States Patent
Shimoi et al.

(10) Patent No.: US 6,401,898 B1
(45) Date of Patent: Jun. 11, 2002

(54) CLUTCH PISTON HAVING FRICTION LINING FOR LOCK-UP CLUTCH, AND PROCESS FOR PRODUCING THE SAME

(75) Inventors: Hiroji Shimoi; Kenichi Toba, both of Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 09/563,845

(22) Filed: May 4, 2000

(30) Foreign Application Priority Data

Mar. 6, 2000 (JP) ........................................ 2000-065764

(51) Int. Cl.[7] ............................................. F16D 69/04
(52) U.S. Cl. .................................. 192/107 R; 192/3.29; 156/265
(58) Field of Search ............................... 192/3.28, 3.29, 192/3.3, 70.14, 107 R; 156/265, 266

(56) References Cited

U.S. PATENT DOCUMENTS

| | | | |
|---|---|---|---|
| 4,260,047 A | * | 4/1981 | Nels ........................ 192/70.14 |
| 4,674,616 A | * | 6/1987 | Mannino, Jr. ............ 192/107 R |
| 5,332,075 A | * | 7/1994 | Quigley et al. ......... 192/107 R |
| 5,361,480 A | * | 11/1994 | Gardner et al. ................ 29/467 |
| 5,776,288 A | * | 7/1998 | Stefanutti et al. ............ 156/263 |
| 6,019,205 A | * | 2/2000 | Willwerth et al. ...... 192/107 R |
| 6,035,991 A | * | 3/2000 | Willwerth et al. ...... 192/107 R |

FOREIGN PATENT DOCUMENTS

JP          5-71610          3/1993

* cited by examiner

*Primary Examiner*—Richard M. Lorence
(74) *Attorney, Agent, or Firm*—Arent Fox Kinter Plotkin & Kahn, PLLC

(57) ABSTRACT

In a clutch piston for a lock-up clutch, which has an annular friction lining bonded thereto and provided with an entire flat friction surface, the friction lining is formed of a plurality of fan-shaped lining segments which are made at a good yield by punching from a lining blank sheet and which are arranged annularly without gaps therebetween. Thus, it is possible to provide a clutch piston which is made at a low cost and operated reliably.

4 Claims, 4 Drawing Sheets

US 6,401,898 B1

CLUTCH PISTON HAVING FRICTION LINING FOR LOCK-UP CLUTCH, AND PROCESS FOR PRODUCING THE SAME

BACKGROUND OF THE INVENTION

1. Field of the Invention

The present invention relates to a clutch piston for a lock-up clutch in a torque converter, and particularly, to an improvement in a clutch piston having a friction lining, which piston divides a lock-up clutch chamber defined between a back of a turbine impeller and a side cover connected to a pump impeller to cover the back of the turbine impeller, into an inner chamber section on the side of the turbine impeller and an outer chamber section on the side of the side cover; the piston is axially movably connected to the turbine impeller such that it is moved under the influence of a difference in pressure between the inner chamber section and the outer chamber section between a clutch-ON position where it is in pressure contact with an inner wall of the side cover, and a clutch-OFF position where it is spaced apart from the inner wall; and the piston is bonded at its end surface opposed to the inner wall with an annular friction lining having an entirely flat friction surface. The present invention also relates to a process for producing such a clutch piston having a friction lining.

2. Description of the Related Art

Such lock-up clutch in a torque converter is constructed such that it is controlled into a turned-ON state in a coupling area to connect the pump impeller and the turbine impeller directly to each other, thereby eliminating a slip between both the impellers to provide an enhancement in transmitting efficiency. Such a lock-up clutch is known, for example, as disclosed in Japanese Patent Application Laid-open No. 5-71610.

The turned-ON state of the lock-up clutch is achieved by bringing the inner chamber section of the lock-up clutch chamber into communication with the working oil supply side and bringing the outer chamber section into communication with a low-pressure side, thereby urging the clutch piston toward the inner wall of the side cover under the influence of the difference in pressure to bring the friction lining into friction engagement with the inner wall.

In this case, it is possible to avoid leakage of hydraulic pressure in the inner chamber section through between the friction lining and the side cover toward the outer chamber section thereby to ensure a good clutch-ON state, because the annular friction lining of the clutch piston has an entire friction surface formed flat, unlike a friction clutch plate of a wet multi-plate clutch mounted in a usual transmitting system, which plate has an oil groove formed in its friction surface.

In the prior art, the annular friction lining having its entire friction surface formed flat is formed of a single seamless member made in an annular shape by punching of a lining blank sheet. However, if such a friction lining is employed, scraps are produced in a large amount from the lining blank sheet, resulting in a very poor yield of the blank sheet. This is a large obstacle to the reduction in cost for clutch pistons having friction linings.

SUMMARY OF THE INVENTION

Accordingly, it is an object of the present invention to provide a clutch piston having a friction lining for a lock-up clutch, which is produced at a low cost and operated reliably, wherein the friction lining is of an annular shape and formed of lining segments made by punching a lining blank sheet at a good yield. It is another object of the present invention to provide a process for producing such a clutch piston having a friction lining.

To achieve the above object, according to a first aspect and feature of the present invention, there is provided a clutch piston having a friction lining for a lock-up clutch, dividing a lock-up clutch chamber defined between a back of a turbine impeller and a side cover connected to a pump impeller to cover the back of the turbine impeller, into an inner chamber section on the side of the turbine impeller and an outer chamber section on the side of the side cover; which is axially movably connected to the turbine impeller such that the clutch piston is moved under the influence of a difference in pressure between the inner chamber section and the outer chamber section between a clutch-ON position where the clutch piston is in pressure contact with an inner wall of the side cover, and a clutch-OFF position where the clutch piston is spaced apart from the inner wall; the clutch piston being bonded at an end surface thereof opposed to the inner wall with an annular friction lining having an entirely flat friction surface, wherein the friction lining is formed of a plurality of fan-shaped lining segments arranged annularly without gaps therebetween.

With the above arrangement, the annular friction lining is formed of the fan-shaped lining segments and hence, the friction lining can be produced at a good yield from a lining blank sheet by regularly punching the lining blank sheet into the lining segments, which contributes largely to a reduction in cost. Moreover, there is no gap between adjacent lining segments and hence, in a turned-ON state of the clutch, it is possible to avoid leakage of hydraulic pressure from the inner chamber section of the lock-up clutch chamber through between the lining segments toward the outer chamber section, thereby maintaining a large difference in pressure between both the chamber sections and ensuring a good clutch-ON state.

According to a second aspect and feature of the present invention, in addition to the first feature, each of the lining segments is bonded to the clutch piston with an adhesive, and end surfaces of adjacent lining segments are bonded to each other with the adhesive.

With the above arrangement, each of the lining segments can be bonded reliably to the clutch piston by the adhesive, and moreover the gap can be eliminated reliably from areas between the lining segments, thereby enhancing the performance of inhibiting the leakage of hydraulic pressure.

According to a third aspect and feature of the present invention, there is provided a process for producing a clutch piston having a friction lining for a lock-up clutch, which is of the above-described type, comprising the steps of: applying an adhesive to at least one of opposed surfaces of the clutch piston and each of the lining segments; placing the plurality of lining segments arranged annularly onto the clutch piston with the adhesive interposed therebetween; and pressing the lining segments against the clutch piston by a pressing jig having a flat pressing surface, thereby bonding each of the lining segments to the clutch piston and at the same time, bringing end surfaces of adjacent lining segments into close contact with each other by the compression and deformation of all the lining segments, and shaping that the surfaces of all the lining segments to be of one plane.

With the above feature, it is possible to provide, at a low cost, a clutch piston having a friction lining, which exhibits good performance of inhibiting the leakage of hydraulic pressure in the clutch-ON state.

According to a fourth aspect and feature of the present invention, in addition to the third feature, further comprising the step of causing the adhesive present between the clutch piston and the lining segments to be diffused to areas between the end surfaces of adjacent lining segments, at the time of pressing the lining segments against the clutch piston by the pressing jig.

With the above feature, each of the lining segments can be bonded reliably to the clutch piston by the adhesive, and the gap can be eliminated reliably from areas between the lining segments.

The above and other objects, features and advantages of the invention will become apparent from the following description of the preferred embodiment taken in conjunction with the accompanying drawings.

BRIEF DESCRIPTION OF THE DRAWINGS

The accompanying drawings show an embodiment of the present invention, wherein.

DESCRIPTION OF THE PREFERRED EMBODIMENT

The present invention will now be described by way of an embodiment with reference to the accompanying drawings.

Figure 1:
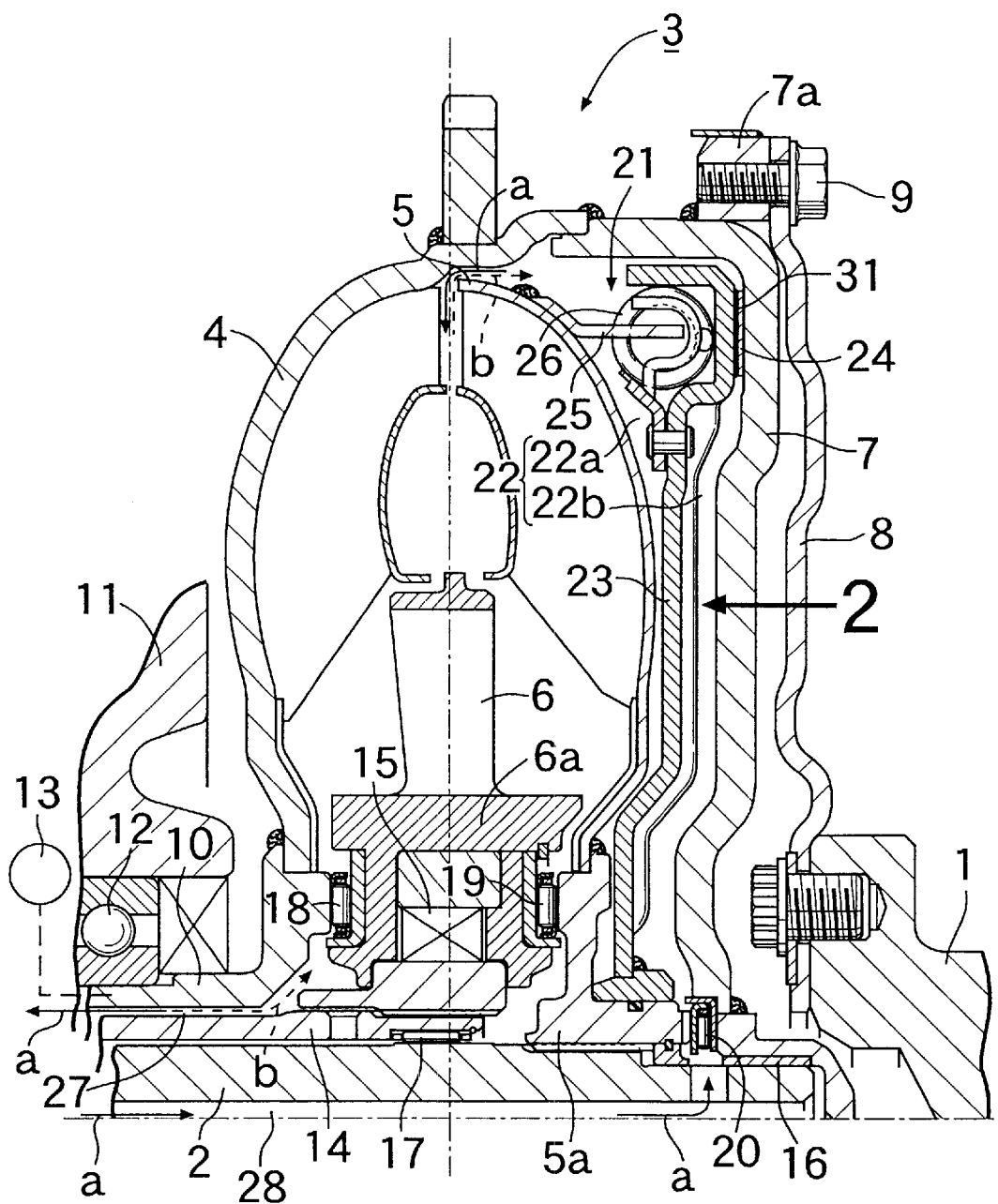
FIG. 1 is a vertical sectional view of a torque converter including a lock-up clutch according to the embodiment.

Referring first to FIG. 1, a torque converter 3 is interposed between a crankshaft 1 of an engine for an automobile and an input shaft 2 of a multi-stage transmission. The torque converter 3 includes a turbine impeller 5 disposed in an opposed relation to a pump impeller 4, and a stator impeller 6 disposed between inner peripheries of the impellers 4 and 5. A side cover 7 is integrally connected to the pump impeller 4 to cover a back of the turbine impeller 5. The side cover 7 has a connecting ring 7a around its outer periphery, and a driving plate 8 secured to an output end of the crankshaft 1 is coupled to the connecting ring 7a by a bolt 9.

A tubular pump shaft 10 connected to a center portion of the pump impeller 4 is rotatably supported in a transmission case 11 with a bearing 12 interposed therebetween, and is connected to an oil pump 13 to drive the oil pump 13. A tubular stator shaft 14 connected to the stator impeller 6 through a flywheel 15 is disposed within the pump shaft 10.

Further, the input shaft 2 is disposed within the stator shaft 14. The input shaft 2 is spline-coupled to a boss 5a of the turbine impeller 5 and relatively rotatably supported in the side cover 7 and the stator shaft 14 with a bushing 16 and a bearing 17 interposed therebetween.

A thrust bearing 18 is interposed between an inner end of the pump shaft 10 and a boss 6a of the stator impeller 6; a thrust bearing 19 is interposed between the boss 6a of the stator impeller 6 and the boss 5a of the turbine impeller 5; and a thrust bearing 20 is interposed between the boss 5a of the turbine impeller 5 and the side cover 7.

A lock-up clutch 21 is formed between the turbine impeller 5 and the side cover 7, and capable of connecting the turbine impeller 5 and the side cover 7 directly to each other. The lock-up clutch 21 includes a lock-up clutch chamber 22 which is defined between the back of the turbine impeller 5 and an inner wall of the side cover 7 and which communicates with an oil chamber defined between the pump impeller 4 and the turbine impeller 5, and a clutch piston 23 disposed in the lock-up clutch chamber 22 to divide the lock-up clutch chamber 22 into an inner chamber section 22a on the side of the turbine impeller 5 and an outer chamber section 22b in the side of the side cover 7. An annular friction lining 24 is bonded to an end surface of the clutch piston 23 which is opposed to the inner wall of the side cover 7.

The clutch piston 23 is connected to a plurality of transmitting claws 25 projectingly provided on the back of the turbine impeller 5 through a torque damper spring 26, and is slidably carried on an outer peripheral surface of the boss 5a of the turbine impeller 6 for axial movement between an ON-position in which the friction lining 24 is in pressure contact with the inner wall of the side cover 7 and an OFF-position in which the friction lining 24 is spaced apart from the inner wall.

A first tubular oil passage 27 is defined between the pump shaft 10 and the stator shaft 14 to communicate with a clearance between the pump impeller 4 and the turbine impeller 5, and a second oil passage 28 is defined in the input shaft 2 to communicate with the outer chamber section 22b through a center portion of the input shaft 2.

Figure 2:
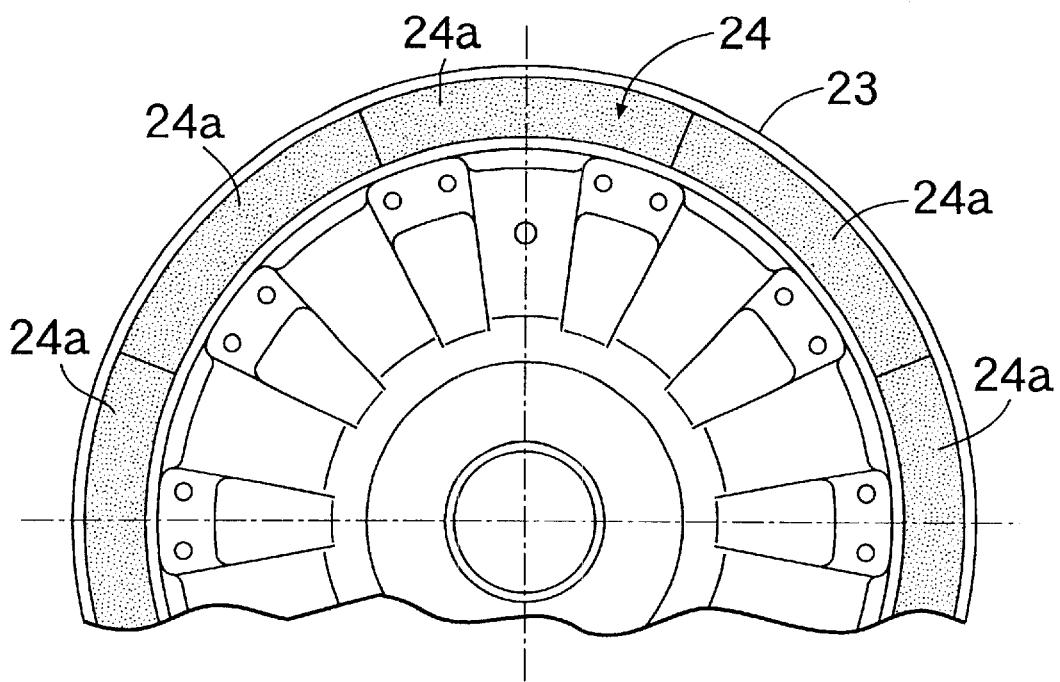
FIG. 2 is a front view (a view taken in a direction of an arrow 2 in FIG. 1) of the clutch piston having a friction lining.
Figure 3:
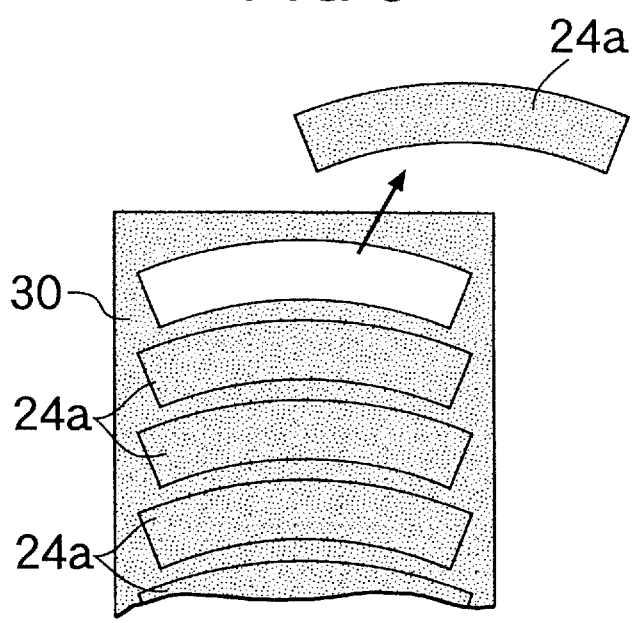
FIG. 3 is an illustration for explaining steps of producing lining segments.
Figure 5:
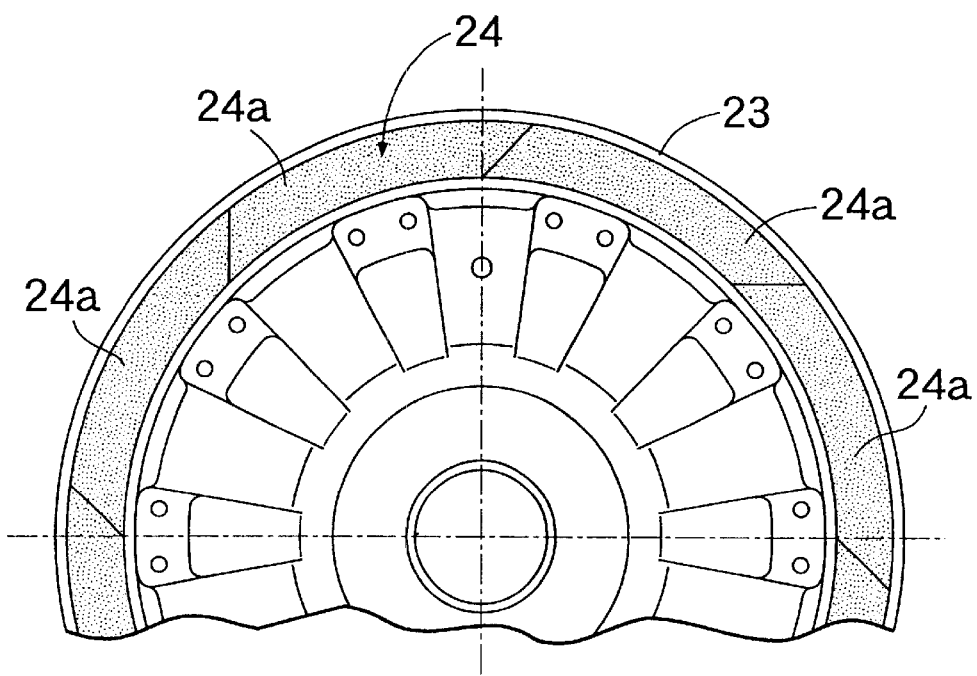
FIG. 5 is a front view similar to FIG. 2, but illustrating a modified example in lining segment.
Figure 6:
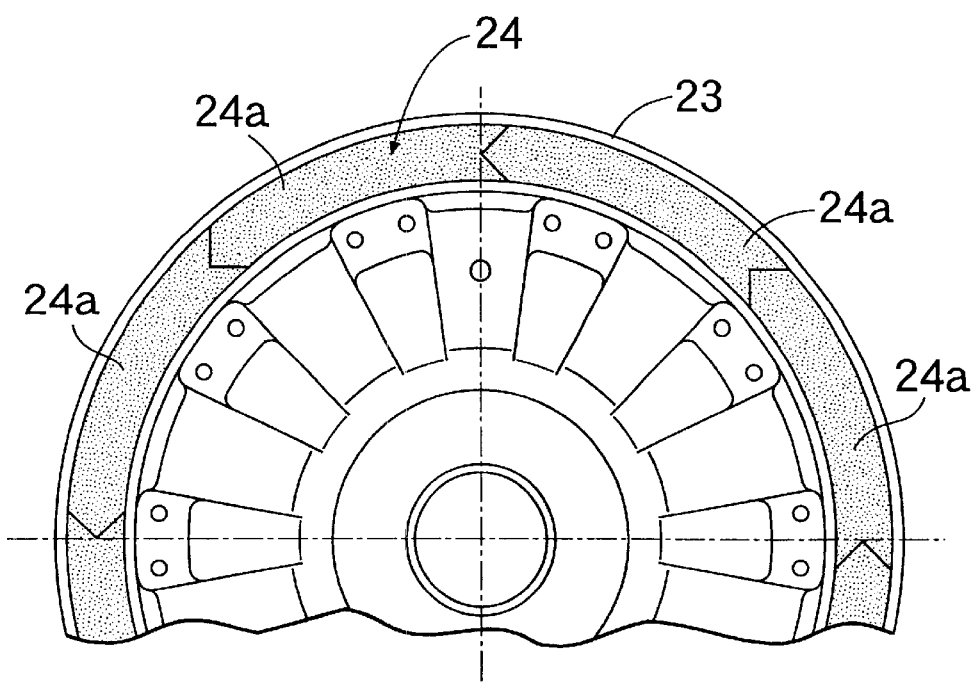
FIG. 6 is a front view similar to FIG. 2, but illustrating another modified example in lining segment.

The friction lining 24 is formed of a plurality of fan-shaped lining segments 24a made by regularly punching a band-shape lining blank sheet and arranged annularly on the clutch piston 23 without gaps, as shown in FIG. 3. In this case, each of opposite ends of each lining segment 24a may be of any shape, for example, may be formed along a radial line of the clutch piston 23, as shown in FIG. 2, or formed along an oblique line inclined with respect to the radial line of the clutch piston 23, as shown in FIG. 5, or formed into a V-shape as shown in FIG. 6. Each of the lining segments 24a is bonded to the clutch piston 23 with an adhesive 31, and end surfaces of adjacent lining segments 24a are also bonded to each other with the adhesive 31. Surfaces of all the lining segments 24a are formed in one plane.

The operation of the first embodiment will be described below.

When the torque converter 3 is in a torque converter range, a discharge side of the oil pump 13 is connected to the second oil passage 28 by a lock-up control valve which is not shown, and the first oil passage 27 is connected to a low-pressure section such as an oil cooler and the like. Therefore, working oil discharged from the oil pump 13 flows in a direction of an arrow a in FIG. 1 through the second oil passage 28 into the lock-up clutch chamber 22, where it flows from the outer chamber section 22b to the inner chamber section 22a. Then, the oil passes into the oil chamber defined between the pump impeller 4 and the turbine impeller 5 to fill the oil chamber, and then flows out of the oil chamber to the first oil chamber 27. Therefore, in the lock-up clutch chamber 22, the pressure in the outer chamber section 22b is higher than that in the inner chamber section 22a. Such a difference between the pressures in the outer and inner chamber sections 22b and 22a causes the clutch piston 23 to be forced away from the inner wall of the side cover 7. Thus, the lock-up clutch 21 is brought into an OFF-state to permit the relative rotation of the pump impeller 4 and the stator impeller 6.

When the torque converter 3 enters a coupling range, the discharge side of the oil pump 13 is connected to the first oil passage, and the second oil passage 28 is connected to the low-pressure section by switching the lock-up control valve. Therefore, the working oil discharged from the oil pump 13 flows in a direction of an arrow b in FIG. 1, through the first oil passage 27 into the oil chamber between the pump impeller 4 and the turbine impeller 5 to fill the oil chamber, and then passes into the inner chamber section 22a of the lock-up clutch chamber 22. As a result, in the lock-up clutch chamber 22, the pressure in the inner chamber section 22a is higher than that in the outer chamber section 22b. Such a difference between the pressures in the outer and inner chamber sections 22b and 22a causes the clutch piston 23 to be urged toward the side cover 7, whereby the friction lining 24 is brought into pressure contact with the inner wall of the side cover 7 to achieve a friction engagement, and in this manner, the lock-up clutch 21 is brought into an ON state. Therefore, the pump impeller 4 and the stator impeller 6 can be connected directly to each other, i.e., the slip between the impellers 4 and 6 can be inhibited, thereby providing an enhancement in efficiency of transmission between the crankshaft 1 and the input shaft 2.

Since the annular friction lining 24 is comprised of the plurality of fan-shaped lining segments 24a, the yield of the annular friction lining 24 can be improved remarkably and the cost can be reduced largely, by forming the fan-shaped lining segments 24a from the lining blank sheet 30 by regular punching.

Moreover, since the end surfaces of adjacent lining segments 24a are bonded to each other without gaps by the adhesive 31, and the surfaces of all the lining segments are formed in one plane, it is possible in a clutch-ON state (a turned-ON state) of the lock-up clutch 21 to avoid the leakage of a hydraulic pressure from the inner chamber section 22a to the outer chamber section 22b through areas between adjacent lining segments 24a, thereby maintaining a large difference in pressures between both of the chamber sections 22a and 22b to ensure the good clutch-ON state. Thus, the clutch piston 23 bears comparison with that in the prior art including a seamless friction lining.

A process for producing the clutch piston 23 having the friction lining 24 will now be described with reference to FIGS. 4A to 4d.

Figure 4A:
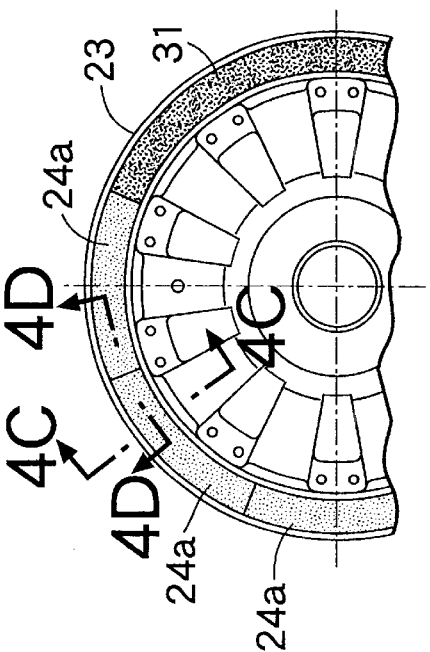
FIGS. 4A to 4D are views for explaining steps of bonding the lining segments to the clutch piston.
Figure 4B:
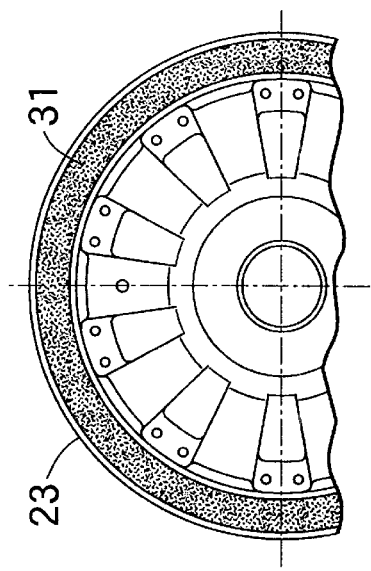
Figure 4D:
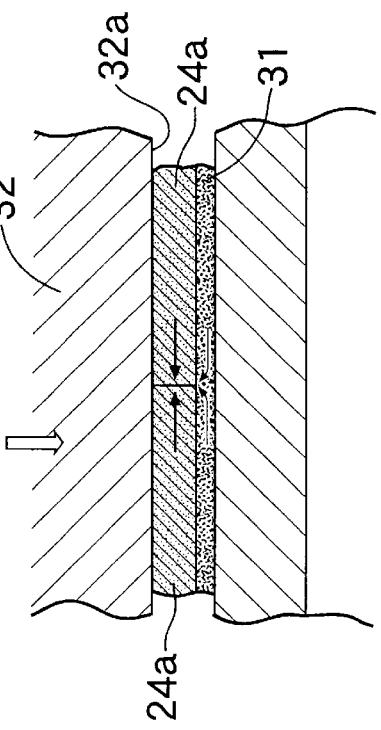
Figure 4C:
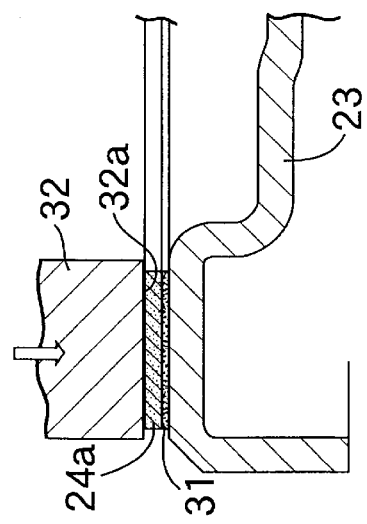

First, as shown in FIG. 4A, an adhesive 31 is applied to a lining bonding area of the surface of the clutch piston 23. Then, a plurality of lining segments 24a made by punching a band-shaped lining blank sheet into a fan shape, as described above, are arranged annularly without gaps on the adhesive 31 applied to the clutch piston 23, as described in FIG. 4B. Finally, all the lining segments 24a arranged annularly are urged against the clutch piston 23, while being heated, by a pressing jig 32 having a flat pressing surface 32a all over, as shown in FIGS. 4C and 4D.

In this manner, all the lining segments 24a arranged annularly can be bonded tightly to the clutch piston 23 with the adhesive 31. At the same time, the compression and deformation of all the lining segments 24a ensures that the end surfaces of adjacent lining segments 24a can be brought into close Contact with each other, and the adhesive 31 between the clutch piston 23 and the lining segments 24a can be diffused to between the closely contacting surfaces to bond the closely contacting surfaces to each other. Further, the surfaces of all the lining segments 24a can be formed in one plane by the flat pressing surface of the pressing jig 32. Thus, it is possible to provide the clutch piston 23 having the friction lining at a low cost using the fan-shaped lining segments 24a, which friction lining inhibits a good performance for inhibiting the leakage of the hydraulic pressure in the turned-ON state of the clutch. In addition, the bonding between the lining segments 24a and the clutch piston 23 and the bonding between the end surfaces of the lining segments are carried out simultaneously, which largely contributes to the simplification of the steps and the improvement of the quality.

Although the present invention has been described in detail, it will be understood that the present invention is not limited to the above-described embodiment, and various modifications may be made without departing from the spirit and scope of the invention defined in claims. For example, when the lining segments 24a is bonded to the clutch piston 23, the adhesive 31 may be applied to the lining segments 24a.

What is claimed is:

1. A clutch piston device, comprising:
   a clutch piston body member; and
   an annular friction lining, wherein said clutch piston body member is bonded to an end surface thereof with the annular friction lining having an entirely flat friction surface, wherein said friction lining is formed of a plurality of arcuate-shaped lining segments arranged annularly without gaps therebetween and wherein each of said lining segments is bonded to said clutch piston body member with an adhesive, and end surfaces of adjacent lining segments are each formed of a flat plane and are bonded to each other with the adhesive.

2. A process for producing a clutch piston having a friction lining for a lock-up clutch, comprising the steps of:
   applying an adhesive to at least one of opposed surfaces of said clutch piston and each of said lining segments;
   placing said plurality of lining segments arranged annularly onto said clutch piston with the adhesive interposed therebetween;
   pressing said lining segments against said clutch piston by a pressing jig having a flat pressing surface, thereby bonding each of said lining segments to said clutch piston; and
   at the same time as the pressing step, bringing end surfaces of adjacent lining segments into close contact with each other by compression and deformation of all said lining segments; and
   shaping the surfaces of all said lining segments to be of one plane.

3. A process for producing a clutch piston having a friction lining for a lock-up clutch according to claim 2, further comprising the step of causing said adhesive present between said clutch piston and said lining segments to be diffused to areas between said end surfaces of adjacent lining segments, at the time of pressing said lining segments against said clutch piston by the pressing jig.

4. A clutch piston device, comprising:
   a clutch piston body member; and
   an annular friction lining, wherein said clutch piston body member is bonded to an end surface thereof with the annular friction lining having an entirely flat friction surface, wherein said friction lining is formed of a plurality of arcuate-shaped lining segments arranged annularly without gaps therebetween and wherein each of said lining segments is bonded to said clutch piston body member with an adhesive, and end surfaces of adjacent lining segments are each formed of a combination of two flat planes and are bonded to each other with the adhesive.

* * * * *